July 9, 1968  H. P. LYNN ET AL  3,391,894
AUTOMOBILE SEAT TRACK
Filed Oct. 22, 1965  3 Sheets-Sheet 1

INVENTOR.
HARRY P LYNN
HENRY J. TISCHLER
BY
Barnes, Kisselle, Raisch & Choate
ATTORNEYS

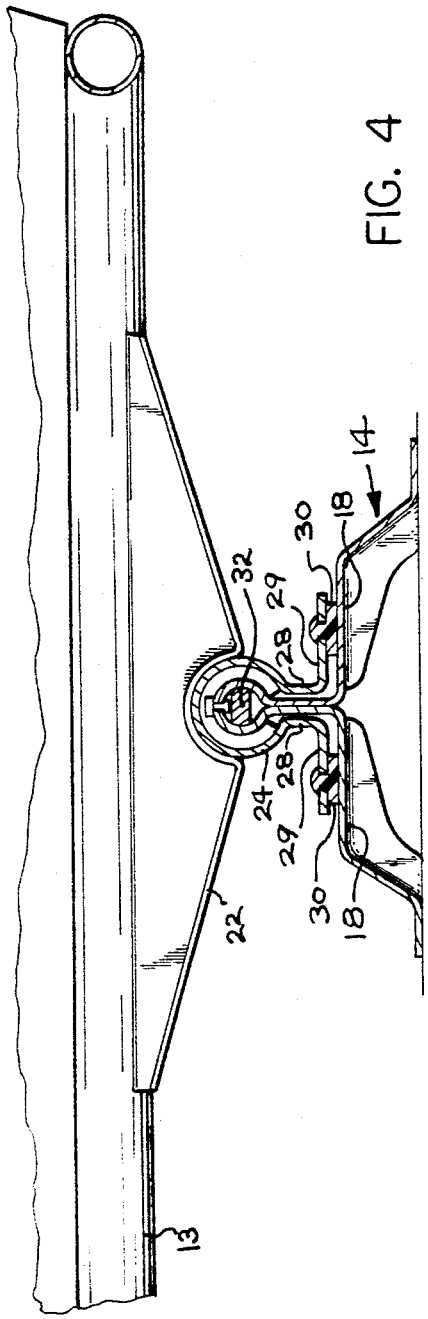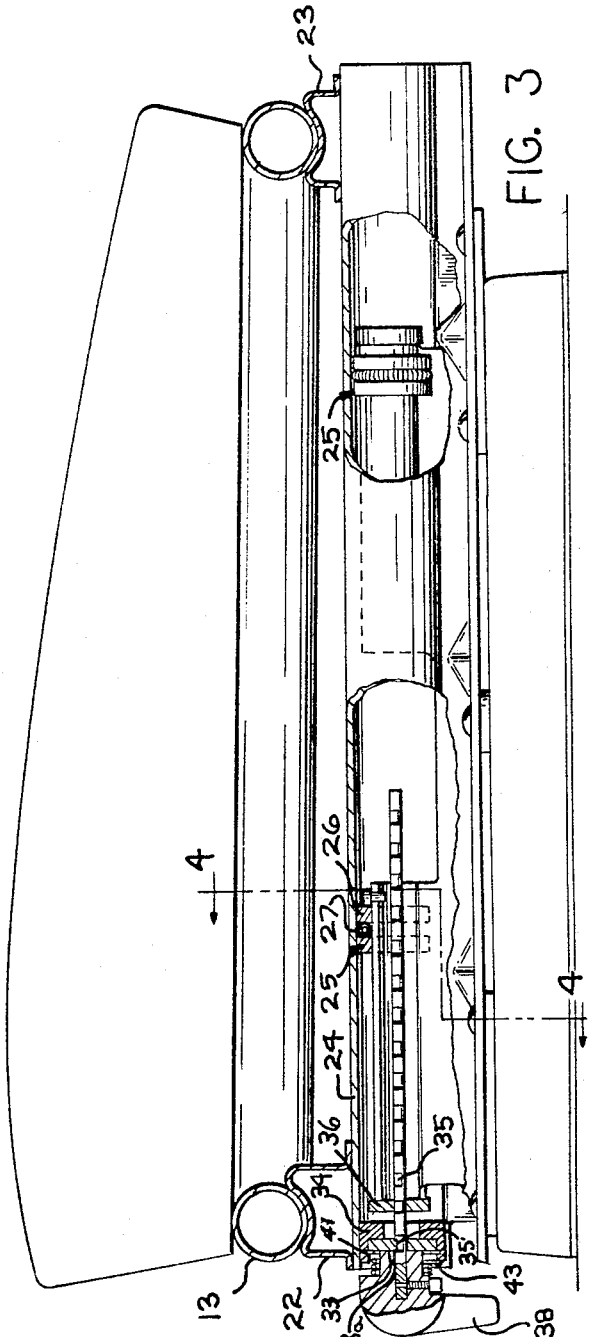

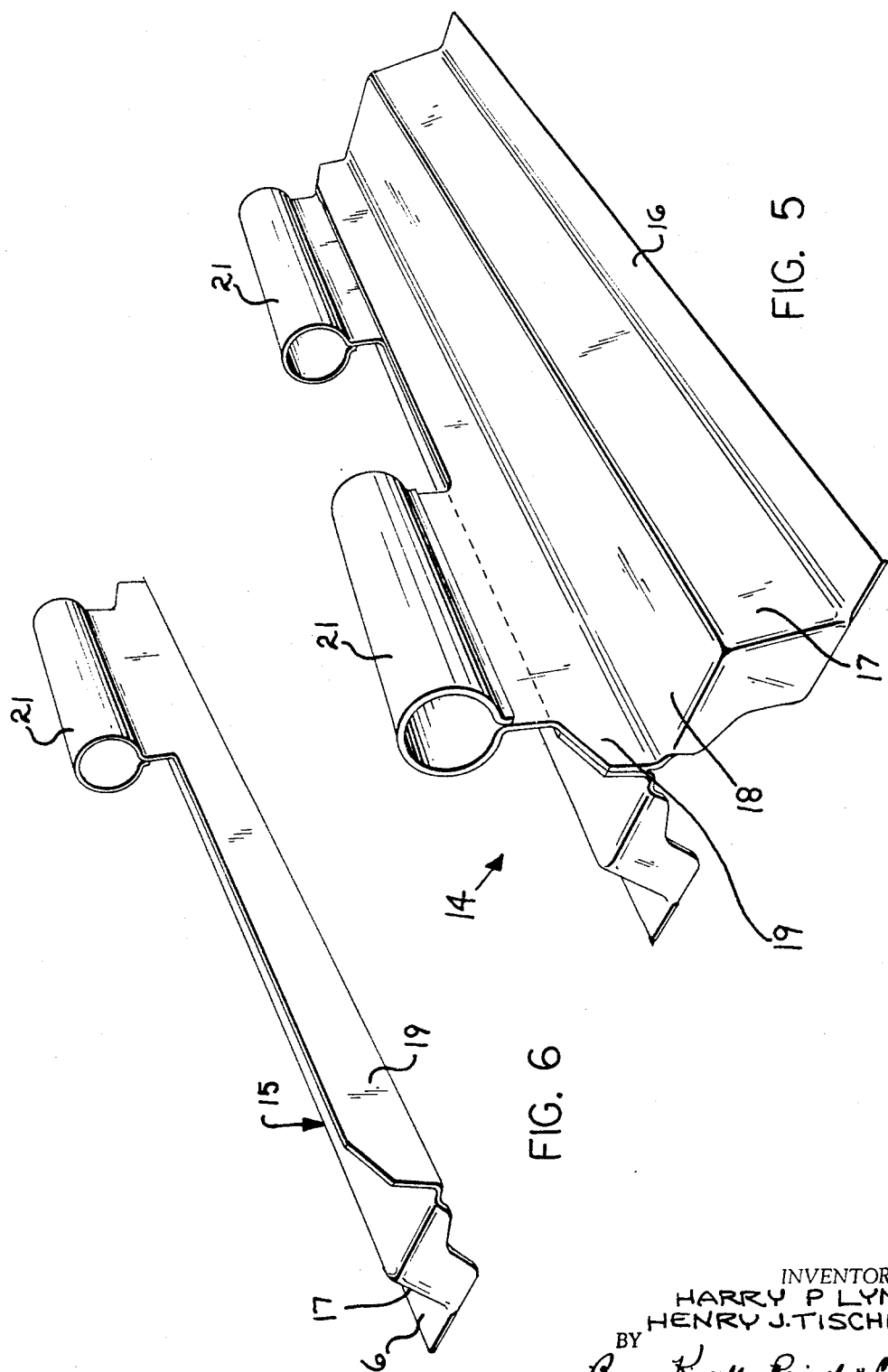

United States Patent Office 3,391,894
Patented July 9, 1968

3,391,894
AUTOMOBILE SEAT TRACK
Harry P. Lynn, Detroit, and Henry J. Tischler, Bloomfield Hills, Mich., assignors to Young Spring & Wire Corporation, Detroit, Mich., a corporation of Michigan
Filed Oct. 22, 1965, Ser. No. 501,901
9 Claims. (Cl. 248—430)

ABSTRACT OF THE DISCLOSURE

The seat track for automobiles and the like disclosed herein comprises a support adapted to be mounted on the floor of an automobile. The support is made of complementary support sections, each of which has a base flange, an upwardly inclined flange, a generally horizontal flange, an upstanding web and a tubular portion bent from one end of the upstanding web. The support sections are assembled with the upstanding webs of the sections in abutting relation and the tubular portion of the sections in longitudinally spaced aligned relation to form a unitary support. A generally tubular carriage is adapted to be mounted on the underside of a seat and has a surface surrounding the tubular portions of the support. Bearing means are interposed between the surfaces of the tubular portion and the carriage. The carriage has laterally extending surfaces thereon complementary to the horizontal surfaces of the support sections and bearing means are interposed between these complementary surfaces.

---

This invention relates to automobile seats and the like and particularly to the seat tracks for automobile seats.

It is customary in seat track mechanisms utilized in automobile seats to provide a seat track along each side edge of the seat so that there are at least two seat tracks for each seat. Such seat tracks usually are provided adjacent two sides of the seat so that they are closely adjacent or project laterally of the sides of the seat. This interferes with the movements of persons in or out of a vehicle and also making the job of upholstering the seat more difficult.

It is the object of this invention to provide a seat track construction wherein a single seat track is provided for an automobile seat.

It is a further object of the invention to provide such a seat track which supports the seat with sufficient strength to withstand the load requirements necessary for use in high speed automobile vehicles.

It is a further object of the invention to provide such a seat track which permits easy egress and ingress of persons from the automobile.

It is a further object of the invention to provide such a seat track wherein the height of the seat with respect to the floor of the vehicle can be changed readily by a minor design change in the seat track.

It is a further object of the invention to provide such a seat track which can be readily upholstered without interferring with the seat track.

Basically, the seat track embodying the invention comprises a support having a tubular portion and a carriage mounted generally centrally on the underside of the seat, the carriage having a complementary tubular surface, and bearing means interposed between the complementary surfaces of the carriage and the support. Further, the carriage includes laterally extending surfaces and the support includes complementary surfaces between which bearing means, such as low friction pads, are provided. By this arrangement, the seat is supported by a single track. The height of the seat can be readily changed in construction by changing the supporting portion without interfering with the main part of the seat track. The support is preferably made of two stamped metal sections which are complementary in shape so that when they are joined, they form the support.

In the drawings:

FIG. 3 is a part sectional longitudinal view through the seat track shown in FIG. 2.

FIG. 4 is a fragmentary sectional view taken along the line 3—3 of FIG. 3.

FIG. 5 is a perspective view of the support utilized in the seat track.

FIG. 6 is a perspective view of one of the complementary sections of the support.

Figure 1:
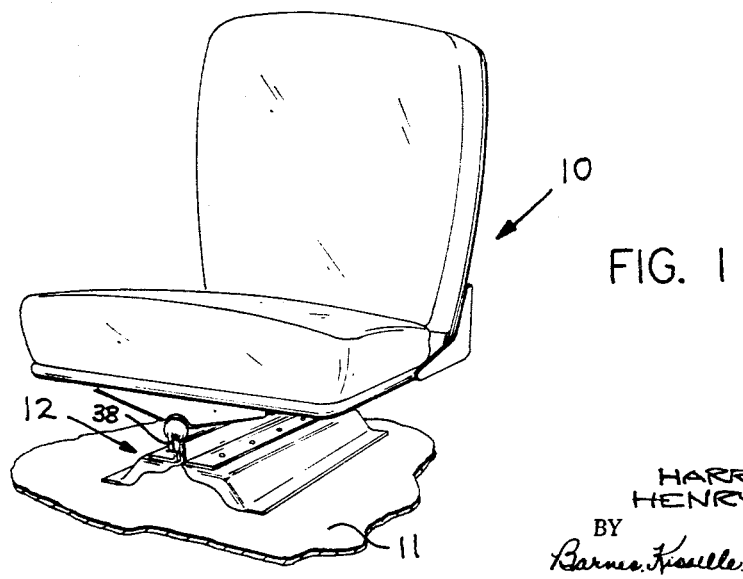
FIG. 1 is a perspective view of a seat embodying the invention.

Referring to FIG. 1, seat 10 is adapted to be mounted on floor 11 of the vehicle by seat track mechanism 12. As shown in FIGS. 3 and 4, the seat 10 comprises a generally tubular frame 13 on the underside thereof. A support 14 is mounted on the floor and is preferably made of sheet metal and includes generally complementary sections 15 (FIGS. 5 and 6). Each section 15 has a base flange 16, an upwardly and inwardly inclined flange 17 and a generally horizontal flange 18. Each section 15 also has an upwardly extending web 19. The sections 15 are assembled as shown in FIG. 6 with the webs 19 abutting one another and welded to one another to provide a unitary support. The upper end of one end of each web 19 is bent to form a tubular support portion 21.

Brackets 22, 23 are provided on the front and rear rail portions of the frame 13, and a tubular carriage 24 is welded thereto. The tubular carriage 24 is telescoped over the tubular portion 21 and bearings 25 are provided at longitudinally spaced points between the complementary surfaces of the carriage 24 and tubular portions 21. The bearing assemblies 25 preferably consist of guides 26 and tightly wound springs 27 that roll as the carriage moves relative to the tubular portions as described and claimed in the patent to Edward D. Dall, 3,007,668, issued Nov. 7, 1961.

Figure 2:
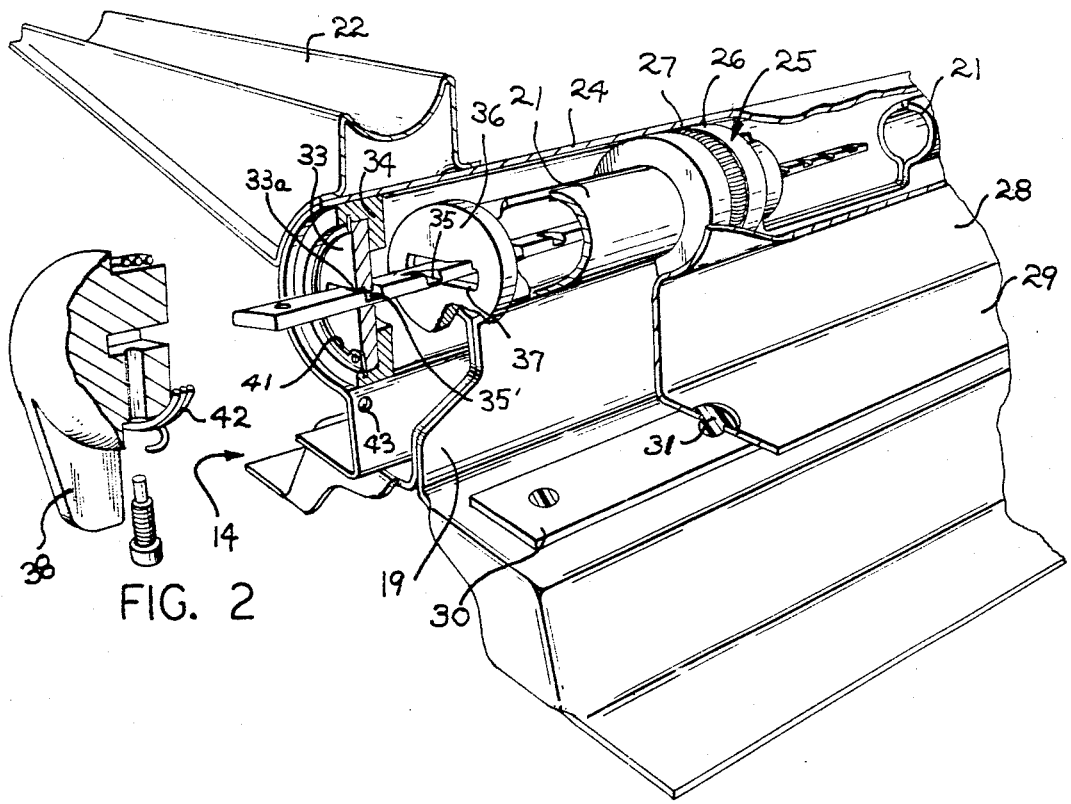
FIG. 2 is a fragmentary part sectional perspective view through a seat track utilized in the seat shown in FIG. 1.

As further shown in FIGS. 2 and 4, generally vertical flanges 28 extend downwardly from the tubular portion of the carriage 24 and lateral flanges 29 extend outwardly from the lower ends of the flanges 28 in generally complementary relation to the horizontal portions 18 of the support 14. Pads 30 of low friction materials such as nylon or Teflon are provided at longitudinally spaced points on the underside of flanges 29 in bearing relationship to the upper surfaces of horizontal portions 18. The pads 30 preferably include pin portions 31 that extend upwardly through openings in the flanges 29 by which the pads are fastened to the flanges 29.

By this arrangement, the seat is supported on the support 14 and moves readily longitudinally thereto. Bearing relationship between the flanges 29 and supports 18 permits easy movement longitudinally but prevents any lateral movement of the seat and holds it in rigid lateral relationship against any rotation with respect to the axis of the tubular portion 21.

As shown in FIGS. 2, 3 and 4, a rod member 32 extends through and is fixed on a disc 33 which is journalled on an end wall 34 that closes the end of the carriage 24. Rod member 32 has a non-circular cross section and is formed with a plurality of longitudinally spaced diametrically opposed notches 35. A slot 33a extends to the periphery of the disc 33 and the sides of slot 33a engage the endmost pair of notches 35' to fix the rod member 32 on the disc 33. The disc 33 is journalled on the wall 34 by a snap ring 41 which extends into a groove in the wall 34.

Rod member 32 extends through a locking plate 36 on the end of the forward tubular portion 21. Locking plate 36 has a non-circular opening 37 corresponding in cross section to the cross section of the rod member 32. A handle 38 is fixed to rod member 32. A helical spring 42 is mounted within the end of carriage 24 and over handle 38. One end of the spring 42 is connected to the handle 38 and the other end is connected to the carriage 24 as at 43 to yieldingly urge the rod member 32 in a direction to cause an engagement of the notches 35 with the edges of the opening 37 in the blocking plate 36. By swinging the handle 38, the rod member 32 may be rotated into a position where the notches are out of engagement with the sides of the opening 37 so that the seat can be adjusted by moving the carriage 24 longitudinally of the tubular portion 21.

It can thus be seen that there has been provided a seat track which utilizes a single seat track. When the seat track construction embodying the invention is utilized in an automobile, the areas adjacent the sides of the seat are clear and unobstructed permitting easy egress and ingress of the person from the automobile. By changing the height of the inclined portions 17 of the support sections 15, the height of the seat can be changed without in any way changing the design of the seat track or latching structure. In addition, the provision of the single track permits upholstering without interference.

We claim:

1. In a seat track for automobiles and the like, the combination comprising
a support adapted to be mounted on the floor of an automobile,
said support having a generally tubular portion vertically spaced above the remainder of said support,
a carriage adapted to be mounted on the underside of a seat and having a generally tubular surface surrounding the tubular portion of said support,
bearing means interposed between said surfaces of said tubular portion and said carriage, said carriage having portions thereof extending longitudinally along the sides of and spaced from said tubular surface of said carriage defining laterally extending surfaces thereon,
said support having complementary laterally extending surfaces,
and bearing means extending between said laterally extending surfaces of said carriage and the complementary surface of said supports.

2. The combination set forth in claim 1 including latch means within said tubular carriage, said latch means extending into said tubular support portion and adapted to engage said tubular support portion to lock said tubular carriage on said tubular support portion.

3. The combination set forth in claim 1, wherein said bearings between said laterally extending surfaces of said carriage and the complementary surfaces of said support comprise longitudinally extending pads of low friction material.

4. In a seat track for automobiles and the like, the combination comprising
a support adapted to be mounted on the floor of the automobile,
said support having a generally vertically extending web,
a tubular portion on the upper end of said web,
a carriage adapted to be mounted substantially centrally on the underside of the seat and having a surface surrounding the tubular portion of said support,
bearing means interposed between said surfaces of said carriage and said tubular portion of said support,
said carriage having portions thereof extending longitudinally along the sides of and spaced from said tubular surface of said carriage defining laterally extending portions,
said support having complementary portions to said laterally extending portions,
and bearing means interposed between said laterally extending portions and said complementary portions.

5. The combination set forth in claim 4 including latch means within said tubular carriage, said latch means extending into said tubular support portion and adapted to engage said tubular support portion to lock said tubular carriage on said support.

6. In a seat track for automobiles and the like, the combination comprising
a support adapted to be mounted on the floor of an automobile,
said support comprising complementary support sections,
each said section including a base flange,
an upwardly inclined flange extending from said base flange,
a generally horizontal flange extending from said upwardly inclined flange,
an upstanding web extending from said generally horizontal flange,
and a tubular portion bent from one end of said upstanding web,
said support sections being assembled with the upstanding webs of said sections in abutting relation and the tubular portion of said sections in longitudinally spaced aligned relation to form a unitary support,
a generally tubular carriage adapted to be mounted on the underside of a seat and having a surface surrounding the tubular portions of said support,
bearing means interposed between said surfaces of said tubular portion and said carriage,
said carriage having laterally extending surfaces thereon complementary to the horizontal surfaces of said support sections,
and bearing means extending between said laterally extending surfaces of said carriage and said complementary generally horizontal surfaces of said support sections.

7. In a seat track for automobiles and the like, the combination comprising
a support adapted to be mounted on the floor of an automobile,
said support comprising complementary support sections,
each said section including a base flange,
an upwardly inclined flange extending from said base flange,
a generally horizontal flange extending from said upwardly inclined flange,
an upstanding web extending from said generally horizontal flange,
and a tubular portion bent from one end of said upstanding web,
said support sections being assembled with the upstanding webs of said sections in abutting relation and the tubular portion of said sections in longitudinally spaced aligned relation to form a unitary support.

8. In a seat track for automobiles and the like, the combination comprising
a support adapted to be mounted on the floor of an automobile,
said support comprising complementary support sections,
each said section including a base flange,
an upwardly inclined flange extending from said base flange,
a generally horizontal flange extending from said upwardly inclined flange,
an upstanding web extending from said generally horizontal flange,
and a tubular portion bent from one end of said upstanding web,
said support sections being assembled with the upstanding webs of said sections in abutting relation and the tubular portion of said sections in longitudinally spaced aligned relation to form a unitary support, a generally tubular carriage adapted to be mounted on the underside of a seat and having a surface surrounding the tubular portions of said support, bearing means interposed between said surfaces of said tubular portion and said carriage.

9. In a seat track for automobiles and the like, the combination comprising a support adapted to be mounted on the floor of an automobile, said support including spaced base flanges, an upwardly inclined flange extending from each said base flange, a generally horizontal flange extending from each said upwardly inclined flange, an upstanding web extending from said generally horizontal flanges, and a tubular portion on the upper end of said web, a generally tubular carriage adapted to be mounted on the underside of a seat and having a surface surrounding the tubular portions of said support, bearing means interposed between said surfaces of said tubular portion and said carriage, said carriage having laterally extending surfaces thereon complementary to the horizontal surfaces of said support sections, and bearing means extending between said laterally extending surfaces of said carriage and said complementary generally horizontal surfaces of said support sections.

References Cited

UNITED STATES PATENTS

| | | | |
|---|---|---|---|
| 1,701,044 | 2/1929 | Knaur et al. | 248—430 |
| 1,987,431 | 1/1935 | Browne | 284—430 |
| 2,579,599 | 12/1951 | Moroney | 248—430 |
| 3,007,668 | 11/1961 | Dall | 308—3.8 XR |
| 3,062,592 | 11/1962 | Allen | 308—3.6 |
| 3,259,354 | 7/1966 | Dall | 248—429 |

ROY D. FRAZIER, *Primary Examiner.*

R. P. SEITTER, *Assistant Examiner.*